June 10, 1930. F. E. SHARP 1,763,265
TRACTION CONTROL FOR COMBINED HARVESTERS
Filed Jan. 19, 1928
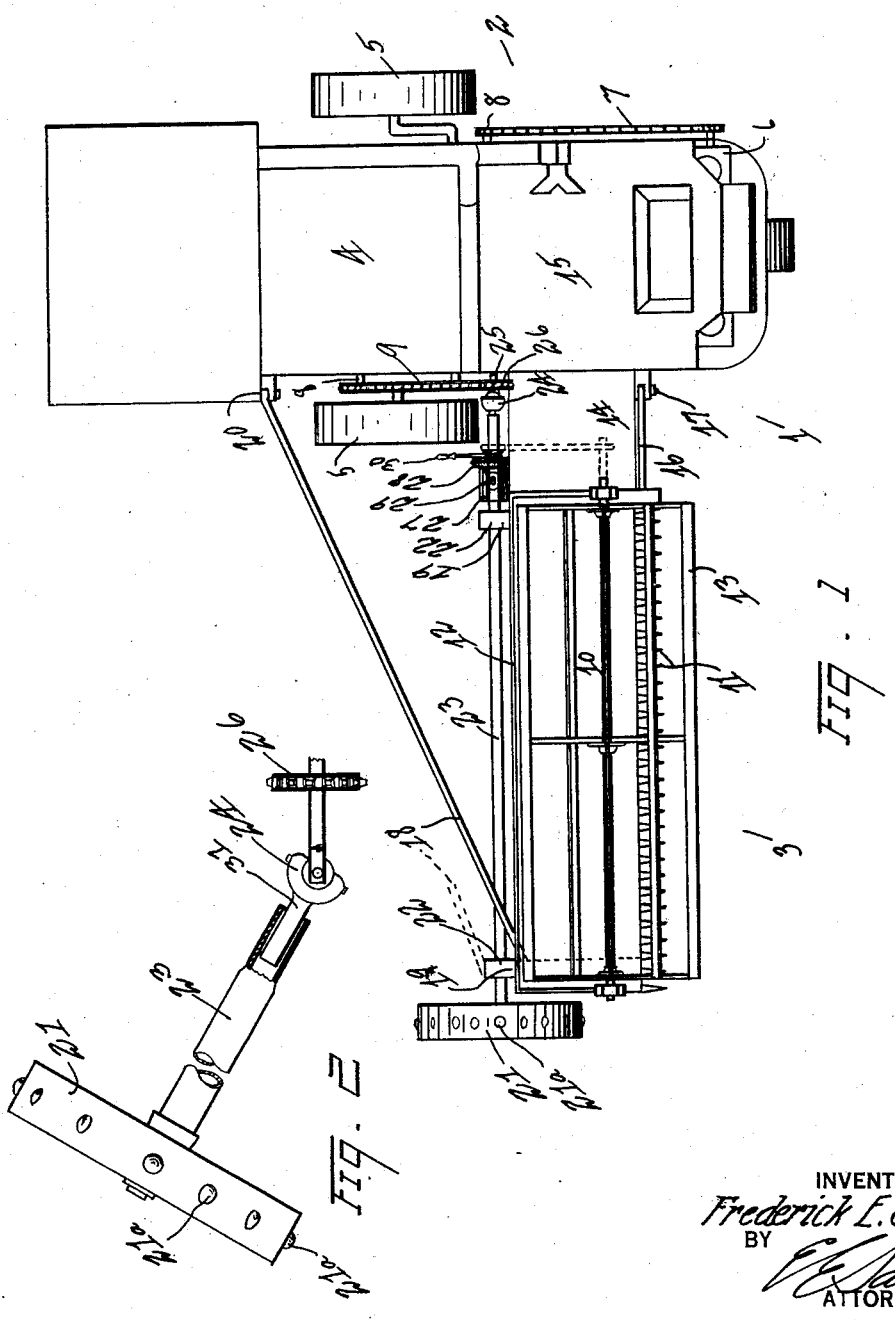
INVENTOR
Frederick E. Sharp
BY
ATTORNEY Patented June 10, 1930

1,763,265

UNITED STATES PATENT OFFICE

FREDERICK E. SHARP, OF PRESCOTT, WASHINGTON

TRACTION CONTROL FOR COMBINED HARVESTERS

Application filed January 19, 1928. Serial No. 247,929.

This invention relates to header drives for combined harvesters and the like and has as one of its objects to provide means whereby the lateral extension formed, in this case, by the header may be rendered an advantage rather than a disadvantage.

Another object of the invention is to provide means to utilize the leverage of the extended members to assist controlling the movement of the main implement or machine.

A further object of the invention is to provide a header drive that will assist in the cutting operation.

A further object of the invention is to provide a header drive that by the use of standard parts will provide a function entirely new and novel.

A further object of the invention is to provide a header drive that may be utilized to assist in turning sharp corners.

A further object of the invention is to provide a header drive that will assist in keeping the header in the grain.

With these and other objects in view, reference is now had to the accompanying drawings in which—

Fig. 1 is a plan view of a combined harvester; and

Fig. 2 is a side elevation of part of the device, enlarged, showing its angle of inclination.

Having reference to the drawings, like numerals refer to like parts throughout the several views and the numeral 1 refers to a combined harvester which consists of a thresher portion 2 and a header portion 3.

While a combined harvester is shown, it is obvious that the device herein described and claimed is equally applicable to other farm implements and machines having a driving mechanism, or to which a driving mechanism may be applied, such for instance as a header, a header and binder, seeders with extensions, or the like, and hence I do not wish to be restricted in its use to any one machine.

In the following description, the thresher portion 2 consists of a main housing 4 supported by wheels 5, and carrying a prime mover 6 on the front end thereof, with a chain belt 7 operably connecting the prime mover with other parts of the machine as at 8, from whence the power is communicated through the chain belt 9 (the operative parts enumerated constituting a driving mechanism) to other parts of the machine, (in the usual manner of such construction, not shown).

Let it here be understood that while a prime mover 6 is referred to and in this case is represented as an internal combustion engine, that where "ground" power is used, i.e., power obtained from a traction wheel 5, this power is deemed the equivalent of an engine and to all intents and purposes will be considered as a prime mover in this description.

The header portion 3 consists in general of a laterally extended header comprising a platform 10, a sickle 11 positioned on the forward edge of the platform, a back 12 (or screen) positioned perpendicular to the platform and at its back edge, a reel 13 positioned above the platform, and a conveyer 14 extending (in this case) into the cylinder house 15 of the harvester. Extending laterally and in line with the front edge of the header is a bar 16 that is pivotally attached to the thresher by a hinge 17 while a diagonal bar 18 extends from the frame 19 rearward and laterally in the manner shown by the solid lines, or connected to the rear of the frame as shown by the dotted lines, to be pivoted to the thresher in a like manner by a hinge 20.

The diagonal bar 18 supplies a second hinge whereby the header is supported at its inner end by the thresher, and is thereby permitted to rise and fall with the contour of the ground over which the machine operates.

To support the outer end of the header a grain wheel 21 is provided having calks 21ª and the header is supported at its outer end thereby through the medium of rearwardly extending journals 22 in which is mounted an axle 23. The axle is rigidly secured to the grain wheel, to rotate therewith, and is extended laterally and parallel to the rear edge of the platform 10 to finally terminate in close proximity to the thresher to be in a suitable position for operable connection with the source of power, or driving mechanism. Obviously, connection may be made to the reel 13, as shown by the dotted lines in Fig. 1, to drive the grain wheel.

On the hinge line, and positioned approximately midway between the two hinges, a universal coupling 24 is associated with the axle whereby the axle may move in a vertical arc with the header, and irrespective of the movement of the thresher, while a stub shaft 25 may be journalled in the harvester and carry a sprocket wheel 26 to be driven by the chain belt 9 in the usual manner.

Now a transmission gear 27 and clutch 28 is incorporated with the axle, or at any suitable place between the power source and the grain wheel, and this gear and clutch mechanism is adapted to change the speed of the grain wheel 21 and to throw it into and out of gear as desired.

By this means, and the lever handles 29 and 30 respectively, a variable speed may be imparted to the grain wheel and the power and speed be thus controlled therewith.

To provide for lateral play in the axle a spline shaft 31 is advised, as shown in Fig. 2.

In use the header is operated in the usual well known manner. During the movement of the combined harvester about the field and assuming that a side hill be encountered, under these conditions a certain slippage down hill will occur under ordinary circumstances.

By adjusting the transmission so that the grain wheel will lag back, the drive wheels of the harvester will be held pointed up hill and the harvester will maintain its position on the side hill, overcoming the tendency to slip.

Also on turning corners by accellerating the grain wheel, a much shorter turn can be made and where heavy grain is to be cut power on the grain wheel will overcome the drag against the sickle.

By controlling the movement of the extended member the main machine may be held in a level position longitudinally.

Having thus described my invention, I claim:

1. In a traction control for combined harvesters, a driving mechanism associated with said harvester, a header, a grain wheel supporting the outer end of the header, an axle rigidly secured to and extended from said wheel to the driving mechanism of said harvester and means integral with said axle to impart and control the power and speed of said grain wheel.

2. In a traction control for combined harvesters, the combination with a driving mechanism associated with said harvester, a header hingedly attached to the harvester and having a grain wheel, an axle rigidly attached to and extended from said grain wheel to the said driving mechanism of said harvester, and provided with a universal coupling on the hinge line of said header, and means integral with said axle to impart to and control the power and speed of said grain wheel.

3. In a traction control for combined harvesters, the combination with a driving mechanism associated with said harvester, a driving mechanism, and a hinged header having a grain wheel, an axle secured rigidly to said wheel and extended from said grain wheel to the said driving mechanism of said combine, a universal coupling associated with said axle and positioned on the hinge line of said header, and a transmission device integral with said axle and adapted to impart to and control the power and speed of said grain wheel.

4. In a traction control for combined harvesters, the combination with a driving mechanism, and hinged header having a grain wheel, an axle secured rigidly to said grain wheel and extended to a driving mechanism of said combine, a universal coupling associated with said axle and positioned on the hinge line of said header, and a transmission and clutch mechanism incorporated between the power source and said wheel and formed integral with said axle to impart to and control the power and speed thereof.

5. In a traction control for combined harvesters, including its header, the combination with the operating mechanism of said harvester, the header, and a grain wheel disposed for constant contact with the ground, of journals rigidly attached to said header, an axle rigidly secured to and rotatable with said grain wheel, and mounted in said journals and adapted to strengthen said header and extended for and operably connected with said operating mechanism, and means integrally associated with said axle to provide for independent control of said grain wheel.

6. In a traction control for combined harvesters, the combination with the operating mechanism, the header thereof hingedly attached to said harvester, and a grain wheel, of journals rigidly attached to said header, an axle rigidly secured to and rotatable with said grain wheel, and mounted in said journals and disposed to strengthen said header, and extended for and operably connected with said operating mechanism, and means integral with said axle to provide for the independent control of said grain wheel and to provide for the maximum movement of said header in a vertical arc.

In testimony whereof I affix my signature.

FREDERICK E. SHARP.